United States Patent [19]
Ballard et al.

[11] Patent Number: 5,305,434
[45] Date of Patent: Apr. 19, 1994

[54] SYSTEM AND METHOD FOR EXECUTING PANEL ACTIONS FROM PROCEDURES

[75] Inventors: David J. Ballard, Austin; Carrie J. Bracht; Gayle E. Fisher, both of Round Rock; Michael E. Payne; Troy D. Spencer, both of Austin, all of Tex.

[73] Assignee: International Business Machines Corporation, Armonk, N.Y.

[21] Appl. No.: 861,357

[22] Filed: Mar. 30, 1992

Related U.S. Application Data

[63] Continuation of Ser. No. 421,482, Oct. 13, 1989, abandoned.

[51] Int. Cl.$^5$ ............................................. G06F 15/62
[52] U.S. Cl. ................................. 395/155; 395/600; 395/161
[58] Field of Search ............... 395/100, 118, 148, 149, 395/600, 155, 156, 157, 159

[56] References Cited

U.S. PATENT DOCUMENTS

| 4,586,158 | 4/1986 | Brandle | 364/900 |
|---|---|---|---|
| 4,672,575 | 6/1987 | Stephens | 364/900 |
| 4,805,099 | 2/1989 | Huber | 364/200 |
| 4,823,283 | 4/1989 | Diehm et al. | 364/521 |
| 4,839,822 | 6/1989 | Dormond et al. | 364/200 |
| 4,866,634 | 9/1989 | Reboh et al. | 364/900 |
| 4,870,591 | 9/1989 | Cicciarelli et al. | 364/200 |
| 4,888,690 | 12/1989 | Huber | 364/200 |
| 4,896,290 | 1/1990 | Rhodes et al. | 364/900 |
| 4,896,291 | 1/1990 | Gest et al. | 364/900 |
| 4,939,507 | 7/1990 | Beard et al. | 364/200 |
| 4,945,476 | 7/1990 | Bodick et al. | 364/200 |
| 4,982,344 | 1/1991 | Jordan | 364/900 |

OTHER PUBLICATIONS

Oracle SQL*Forms Designer's Reference, Version 2.0, Copyright 1987, Part No. 3304-V2.0, pp. 8-2 to 9-34.
Informix-SQL Relational Database Management System User Guide, Copyright 1987, Version 2.10, Part No. 200-404-1015-0 Rev. A, Chapter 6, "Creating Your Own Forms"—Attributes.
Ashton-Tate/Microsoft Learning Transact-SQL, Copyright 1989, Chapter 14, "Creating Triggers".

*Primary Examiner*—Heather R. Herndon
*Attorney, Agent, or Firm*—Robert M. Carwell

[57] ABSTRACT

In a relational database system, facility is provided for a navigator controlling a procedure executor and a panel executor. Procedures are specified by a procedural language which includes current panel operations being permitted as a panel commands in the procedural language. The panel may call these procedures and the procedures may thus include panel actions executed by the panel executor upon being called. The procedure monitors the state of the current panel which may comprise monitoring multiple fields and may effect changes thereto automatically and as a function of the monitoring, as well as direct commitment of data in the panel. Provision is further made for looping logic in the procedures whereby batch panels are effected without the need for user interaction.

9 Claims, 9 Drawing Sheets

FIG. 5

Actions Exit | Help

Take action based on pay record.

Complete by typing; then select from Actions above or press Ctrl + F1 to change this row and display the next row.

Customer Number [ 399817 ]—134

Name             S. Fisher
Shipping address 11200 Burnet Rd. Tx
Billing address  934 Peachtree St. Tx Credit limit     1000 —139
Current balance  1000 —141
Max balance      1950 —143

132— * Send this customer a NASTY letter. * —136

Percent of ontime payments is:    0.49

FIG. 7

```
Actions  Exit                                               Help
                       Procedure PROCB
 /**/
 'get current (late_val = ontime)'
 'get current (cr_rate = rating)'
 'get current (max = max_bal)'
 'get current (current = curr_bal)'
 'get current (limit = cred_lim)'
 if late_val < .5 then do
    cr_rate = 5
    limit = current
    'set global (flag = "bad")'
 end
 else do
    if late_val > .65 then cr_rate = 4
    if late_val > .75 then cr_rate = 3
    if late_val > .85 then cr_rate = 2
    if late_val > .95 then do
       cr_rate = 1
       'set global (flag = "good")'
    end
    if cr_rate = 3 then

DOS    QM    OS/2
```

FIG. 8

Actions  E̲xit                    Procedure PROCC                              Help 218— if cr_rate = 3 then
220—    limit = limit * 1.1
222— if cr_rate = 2 then
224—    limit = limit * 1.2
226— if cr_rate = 1 then
228—    limit = max * 1.2
230— end
232— 'set current (cred_lim = limit)'
234— 'set current (rating = cr_rate)'
236— 'set current (ontime_percent = late_val)'
238— 'change (message = no)'

DOS    QM    OS/2

SYSTEM AND METHOD FOR EXECUTING PANEL ACTIONS FROM PROCEDURES

This is a continuation of application Ser. No. 07/421,482 filed Oct. 13, 1989, now abandoned.

TECHNICAL FIELD

This invention relates to computerized database systems and, more particularly, to panel-procedure interactions for interfacing with databases.

BACKGROUND ART

In the operation of modern computerized database systems, it has been conventional to provide for certain automated actions such as commitment or manipulation of data and prompt display as a function of user interaction and data input. For example, a particular response to a yes/no field of a screen panel (also called a form) might automatically invoke a display of next permissible actions on the database or data from another table not previously visible, or commitment of such related data. The intent was to provide a facility whereby alerts could be provided back to the user and whereby procedures may be invoked to manipulate data independently of that being input.

Thus, a technique began to appear in commercial computerized database products employing capabilities often called triggers which, in turn, might invoke procedures. Representative examples of this technology may be better understood in greater detail with reference to the commercial database products "Oracle", "Informix" and "SQL Server" (Ashton-Tate/Microsoft) and their associated respective support documentation and publications such as the following:

Oracle SQL*Forms Designer's Reference, Version 2.0, Copyright 1987, Part No. 3304-V2.0, pp 8-2 to 9-34.

Informix-SQL Relational Database Management System User Guide, Copyright 1987, Version 2.10, Part No. 200-404-1015-0 Rev. A, Chapter 6 "Creating Your Own Forms"—Attributes.

Ashton-Tate/Microsoft Learning Transact-SQL, Copyright 1989, Chapter 14, "Creating Triggers".

These materials and database software are published by and available from Oracle Corp., Belmont, Calif.; Informix Software, Inc., 4100 Bohannon Drive, Menlo Park, Calif. 94025; Ashton-Tate Corp., Microsoft Corp., and Sybase, Inc., c/o Ashton-Tate Corporation, 20101 Hamilton Avenue, Torrance, Calif. 90502-1319.

Essentially, in accordance with such techniques, a form or panel could be monitored in a predetermined and specified fashion to detect entry before or after a query or change was executed, when an exit was performed or keystroke was actuated, or the like. Upon detection of such a state which activated a trigger, various functions required by the needs of the database user could be performed. These functions might include, for example, data validation such as range-checking for one of the fields, or the like as desired. While this trigger technique did offer significant improvement in database technology, there were nevertheless deficiencies.

First, the trigger was typically limited in being activated by a few relatively simple preset conditions. Thus it was not able to monitor a complex or complete state of a panel including multiple fields as desired, detect complex functional interrelationships between fields, or perform calculations with multiple fields for purposes of initiating procedures.

Accordingly, the primary intent of such triggers as previously indicated was to serve as alerts or prompts to the data enterer, as, for example, in indicating incorrect entry or a next available set of choices. Additionally, the further primary intent was to start procedures which might manipulate data independent to that which appeared in the panel.

As a result of this limited intent and function of the prior triggers, the triggers tended to become collections of pre-defined triggers for specific purposes as they arose, each with their own limitations and inability to work together cooperatively. As an example, if a value was changed in a field and a trigger could be defined for the change, the trigger typically could not be automatically initiated by the change being made by another trigger without some operator input. Thus, the panel designer was constrained to the limitations of the available trigger set. As additional trigger needs arose, more pre-set triggers were simply added to the product but the user or application designer had no flexibility in expanding the triggers beyond the discrete number pre-set by the product prior to its execution.

The existing database technology thus exhibited a need for a more flexible improved procedure-panel interaction provided by the subject invention, wherein panel operations are permitted as panel commands in a procedural language utilized to specify the procedures, thereby permitting a panel designer to have complete control of sequencing, error recovery, and the coupling of actions together.

As an example, it might be desirable in response to customer data input on a panel, to automatically call a procedure to check a customer's credit status and then report back dynamically to the data inputter on the panel a type of letter desired to be sent to the customer (i.e., payment request; increase of credit limit; etc.) when meeting only certain criteria, such as the percentage of on-time payments, as a function of multiple particular panel fields.

However, the prior art triggers, as previously indicated, were not capable of monitoring the plurality of fields, interrelating them in accordance with functional relationships, calling panel actions from procedures, and modifying forms to perform these desired tasks.

Moreover, due to this inability of the called procedure to include current panel operations as commands in the procedures and the associated procedural language specifying the procedure, there was no provision for looping logic to effect batch panels in order to obviate the need for user input. There was no provision, for example, for printing panel results or effecting other multiple panel actions based on conditions of fields as determined by procedural logic; bypassing of rows automatically by procedures which the particular application does not desire the user to process; and user specific initialization based on procedure logic and determination of the particular user running the application; such capabilities being afforded by the procedure's knowledge of the values of fields in the input form in accordance with the invention.

These and other problems are overcome by the subject invention which provides an improved panel-procedure interaction facility.

SUMMARY OF THE INVENTION

In a relational database system, facility is provided for a navigator controlling a procedure executor and a panel executor. Procedures are specified by a procedural language which includes current panel operations being permitted as panel commands in the procedural language. The panel may call these procedures and the procedures may thus include panel actions. In a particular embodiment, a system and method are provided for interacting with a database, comprising specifying a procedure; generating a panel; monitoring a plurality of fields in said panel; detecting when said monitored fields are in a pre-defined state; and executing said procedure in response to said detected state. Provision is further made for looping logic in the procedures whereby batch panels are effected without the need for user interaction.

BRIEF DESCRIPTION OF THE DRAWINGS

The novel features believed to be characteristic of the invention are set forth in the appended claims. The invention itself, however, as well as other features and advantages thereof, will be best understood by reference to the following description of the preferred embodiment, when read in conjunction with the accompanying figures, wherein:

FIG. 5 is a representative screen appearing in the illustrative example application of FIG. 4.

FIGS. 6-9 are screens illustrating procedures set up to implement portions of the flow diagram of the illustrative example of FIG. 4.

DETAILED DESCRIPTION OF THE PREFERRED EMBODIMENT

Figure 1:
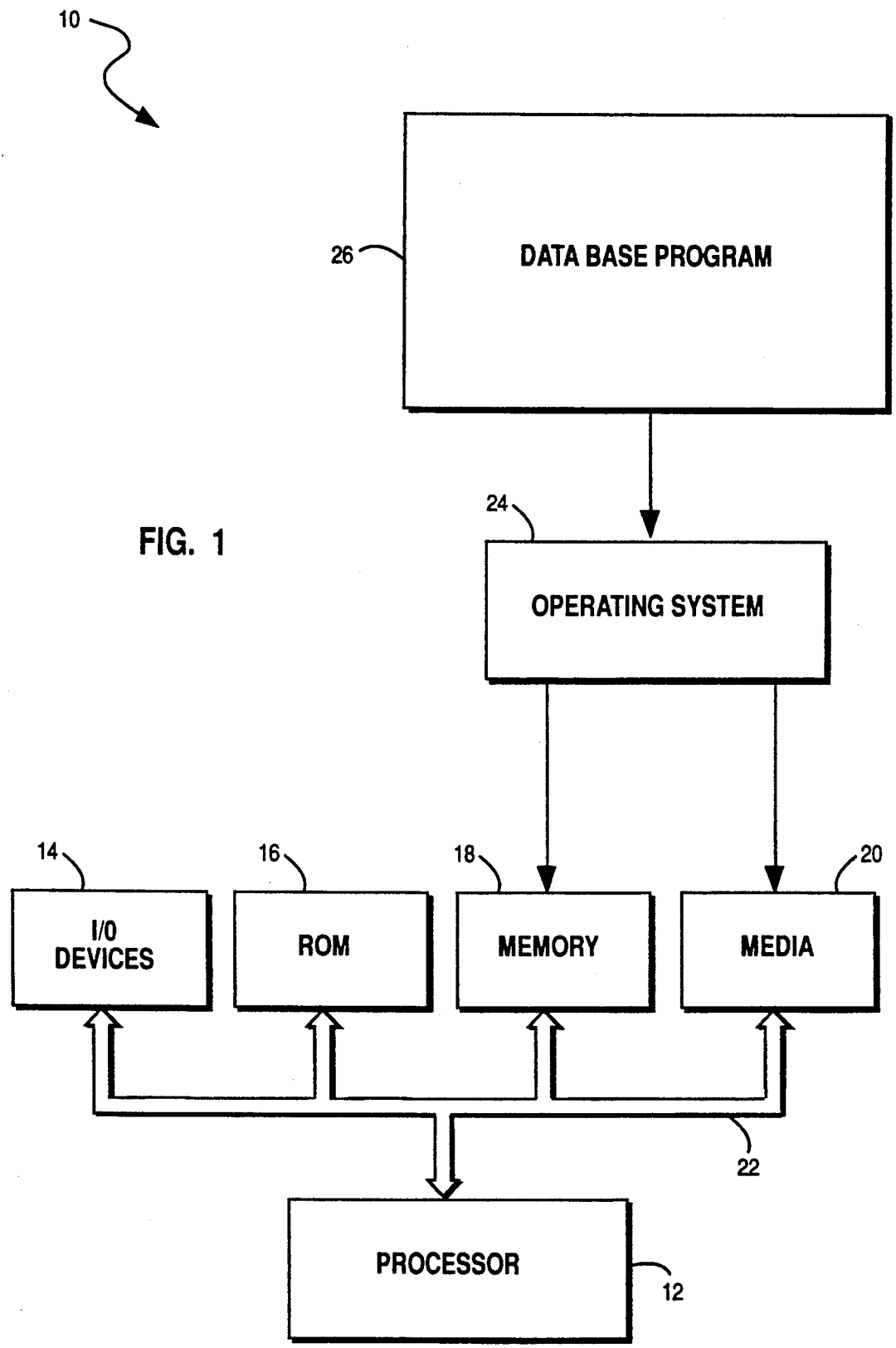
FIG. 1 is a functional block diagram of a data processing computer system for implementing the system and methods of the invention.

First a brief discussion will be provided with reference to FIG. 1 of a general computerized database system adapted for implementing the subject invention. This will be followed by a general description of the problem solved by the invention relative to the prior art with reference to a typical screen output of FIG. 5 and associated representative procedures of FIGS. 6-9 used in implementing the invention. Next follows a discussion with reference to FIG. 2 of a general description on a high level of the operation and function of the procedure, panel executor, and navigator components employed in the invention followed by a description of a generalized flow diagram of FIG. 3 illustrating the operation of the invention. Description of a specific example of the application of the invention and the flow of FIG. 3 will then be provided with reference to the flow diagram of FIG. 4. Finally, representative processes of the invention used to implement the example will be described in detail with reference to FIGS. 6-9.

With reference to FIG. 1, a block diagram is shown of a data processing system which may be used to implement the system of the present invention. The system 10 preferably takes the form of a typical personal computer architecture such as that embodied in the IBM Personal System/2 computers available from the IBM Corporation, Armonk, N.Y. (Personal System/2 is a registered trademark of the IBM Corporation). With respect to the system 10, a microprocessor 12 is provided, such as an Intel 80286 or 80386 device, which is interconnected to a desired selection of I/O devices 14, ROM 16, memory 18, and media 20 by means of a bus 22.

It will be appreciated that in a conventional manner, the bus 22 will be comprised of address, command, and data lines (not shown for clarity), for purposes well known in the art. The I/O devices 14 which may be included in the system 10 of the present invention may include a display such as an IBM Personal System Color Display 8510, a keyboard, a mouse, or the like for user input, and a printer if desired. It will also be appreciated that for purposes of simplicity, adapters have been omitted from FIG. 1, although it will be readily appreciated that such adapters for various devices may either be included as part of the system or available as plug-in options.

Within the read only memory or ROM 16, the basic input/output operating system or BIOS is stored for execution by the processor 12. The BIOS, as is well known, controls the fundamental operations of the computer system 10. Additionally, an operating system 24 is provided such as the OS/2 Extended Edition 1.1 System which will be loaded into memory 18 and will run in conjunction with the BIOS in ROM 16 (OS/2 is a registered trademark of the IBM Corporation).

Additional information on the Personal System/2 and OS/2 systems which may be used in a preferred embodiment to implement the system and methods of the present invention may be found in the following reference manuals and other references cited therein which are herein incorporated by reference:

*IBM Operating System/2 Version* 1.0 *Standard Edition Technical Reference,* IBM Corporation, Part No. 6280201, Order No. 5871-AA;

*Technical Reference Manual, Personal System/2* (*Model* 80), IBM Corporation, Part No. 68X2256, Order No. S68X-2256;

*OS/2 Programmer's Guide,* Iacobucci, Edward, McGraw-Hill, 1988; and

*IBM Operating System/2 Extended Edition Version* 1.0 *Technical Reference,* Publication No. 90X7939.

In accordance with the invention, an application program 26 which effects the function of the invention to be hereinafter described is further provided which may be loaded into memory 18 or stored in other media 20. This media 20 may be of any conventional form such as a hard file, diskettes associated with a disk drive, or the like. In accordance with the aforementioned Extended Edition of the OS/2 Operating System, the database application program 26 may be considered as an extension of the operating system 24 and will include numerous functions conventionally associated with a database program, providing instructions to the processor 12 so as to enable the system 10 to perform relational database functions as herein described. The operator may interface with the database program through the various I/O devices 14, such interfacing including entering, accessing, changing, and deleting data from the database or other such tasks. For example, the user may interact with the database program 26 by inputting some form of data manipulation language command such as an SQL command, well known in the art, via the keyboard. In response thereto, the system 10 will query the data resident in the database in memory in the system, and output the desired answer set for inspection by the user on a video terminal, printer, or the like.

Now that a generalized discussion has been provided of a representative system which may be adapted for implementing the invention, a more detailed description will be provided of the components of the invention enabling a user to interface with the database and the operation and function of these components.

With reference to FIG. 5, visual interfacing with the database program 26 may be provided by panels which may be displayed on a suitable I/O device 14 such as a monitor, a representative example of these panels being shown in FIG. 5. These panels are customized screens that may be used to add, change, delete, browse or otherwise interact with data in database tables accessed by the database program 26.

Typically a panel designer will identify one or more such tables which are to be used in a given application and how these tables are associated or connected with one another. A root table is specified as the top of the hierarchy of tables used in the panel in a conventional relational database manner. In such a panel, a designer may define numerous fields, such as field 134, which may correspond to a column in a specified table such as a customer number table, these fields being referred to in the art as table fields. Additionally, fields may be defined as required which are not associated with a column on the current panel but rather obtain their values from a formula specified by the panel designer known as computed fields. Such a field may be seen at reference numeral 136 which is a computation of the percentage of on time payments made by a particular customer. A panel instance, as shown in FIG. 5, corresponds to one row in a root table and any row(s) from tables connected to the root table by means of conventional relational database technology. A panel set is one or more such panel instances corresponding to one set of criteria that is used to search the database table(s).

It is conventional in database products to provide for such panels to be executed or run in various modes such as Add, Change, and Search modes. A panel is run in the Add mode when the user desires to insert data rows into the database. A panel is run in the Change mode when the user desires to browse or update data rows in the database. The Search mode typically is a submode within the Change mode employed when the user desires to identify the set of rows that are to be updated or browsed.

Additionally, a panel designer typically may also be able to specify actions, available in the Action pull down, to the panel user when the panel is run. As shown at reference numeral 130 in FIG. 5, these actions may be displayed to the user upon activating this area of the screen with a suitable pointing device, depressing a function key or in some other manner. In accordance with the present invention, two types of actions are provided, namely Panel Operations and Commands referred to as Query Manager Commands. Panel Operations provide for the direct manipulation of the data associated with the fields defined for the panel. Query Manager Commands, on the other hand, provide the designer with the ability to perform tasks which are associated with the running panel.

One such Query Manager Command provided by the invention permits a user to run a Procedure. A Procedure is a structured programming language routine that may contain Procedure statements as well as Query Manager Commands. The Procedure statements allow for loops, conditional tests (IF THEN ELSE, etc.), assignments, and comments. A Procedure may also access panel fields to perform assignments, data validation, and the like. Further detail regarding Procedures, the procedural language including syntax and semantics, employed in the invention and the methodology in defining Procedures for use in accordance with the invention may be obtained with reference to IBM Operating System/2 Extended Edition Version 1.2 User's Guide, Vol. 3: Database Manager, Part No. 15F7292 Copyright 1989, with particular reference to Chapters 13–15 thereof. For purposes of the invention at present, however, it will be noted generally that a procedural language such as that employed by the invention is a structured programming language in contradistinction with a conventional programming language such as C, Modula-2, Pascal, or the like. A procedural language, in part, is characterized in obviating the necessity for variable definition or declaration (i.e., for example, whether the variable is a character or numeric field), inasmuch as variables and environments have already been predefined. However, as with a conventional programming language, statements and expressions are available for effecting logic, developing looping constructs, flow and control, and the like.

With respect to the aforementioned provision in the invention for Panel Operations, these may typically include the following operations shown in Table 1 which indicates their name followed by the function they perform:

TABLE 1

| Panel Operations | |
|---|---|
| Operation Name | Type of Function |
| ADD AND NEXT | Inserts new row(s) into database table(s) and initializes panel values to null. |
| ADD AND KEEP | Inserts new row(s) into database table(s) and presents values of the just-added row(s). |
| CHANGE AND NEXT | Updates row(s) in database table(s). |
| DELETE AND NEXT | Removes row(s) from database table(s). |
| NEXT | Presents the next panel instance in the panel set. |
| PRINT | Prints the current panel instance. |
| COMPUTE | Performs computations. |
| SEARCH | Prepares for the specification of a new panel set. |
| EXTENDED SEARCH | Prepares for specification of a new panel set by use of an existing Query Manager query. |

Further detail as to Panel Operations available and their particular function and use, as well as the syntax differences when the Panel Operations are issued from a procedure or directly from a panel, may be obtained by reference to the aforementioned IBM OS/2 EE User's Guide.

It may be recalled from a discussion of the background of the invention that typical computerized database facilities provide for a Query Manager which permits only one Action to be performed at a time from a running panel which may be similar to the hereinbefore described Panel Operations or Query Manager Commands. This is a serious limitation to the customization of database application design inasmuch as the burden of coupling actions together in a desired sequence is placed upon the panel user, thereby removing control from the designer. As but one simple example, a panel designer may desire for the user to always print a copy of all orders before adding orders to a database. With the current designs available in various computerized database products, a user must always remember to select a print action prior to the add action which commits the order to the database. This dependency upon the user furthermore jeopardizes the integrity of the panel design.

One solution to this problem which has been attempted in the prior art is to allow for multiple actions to be tied together, i.e., to provide a facility for compound actions from a running panel. This approach permits the panel designer to specify the coupling and sequence of actions. Employing this method, the above-mentioned scenario could be implemented by the panel designer simply creating one action which is the compounding of the "print" Panel Operation followed by the "add" Panel Operation. Thus, the coupling and sequencing are completely transparent to the user.

However, this method has a serious shortcoming, namely that no error recovery is possible when only part of the compound action has been accomplished. This occurs when the equivalent of Query Manager Commands are involved in the compound action since typically panel code does not have any knowledge or control of such commands. In other words, only the designer would understand the particular application being designed and has the intelligence needed to properly recover from the error. Although, as aforesaid, panel code does not have the ability to perform proper error recovery, procedural languages could in fact provide a mechanism for placing the decision making in the hands of the panel or application designer. However, although in the prior art a procedural language may be invoked to provide such coupling and sequencing, such procedural languages did not have the ability to process the database-specific data manipulation only available to the panel code. Accordingly, some method and system was highly desired which could afford an application or panel designer with complete control for the coupling, sequencing, and error recovery functions necessary in the operation of a computerized database system.

Figure 2:
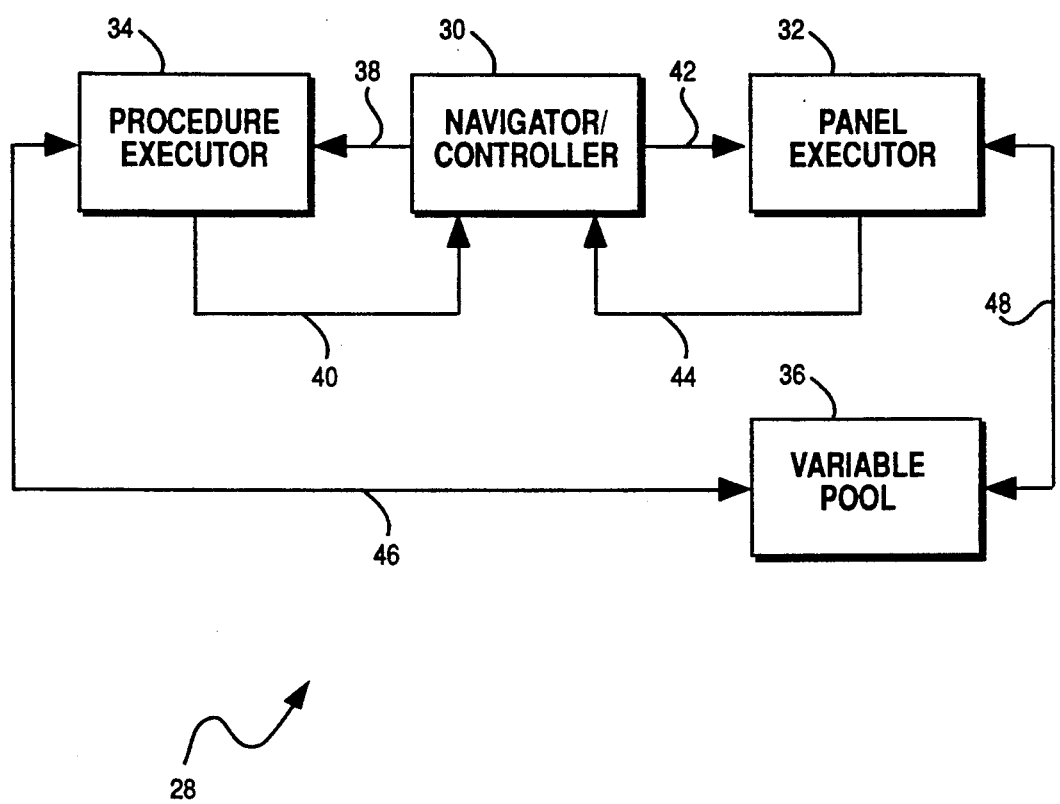
FIG. 2 is a functional block diagram of a subsystem of the invention employed in conjunction with the computer system of FIG. 1.
Figure 3:
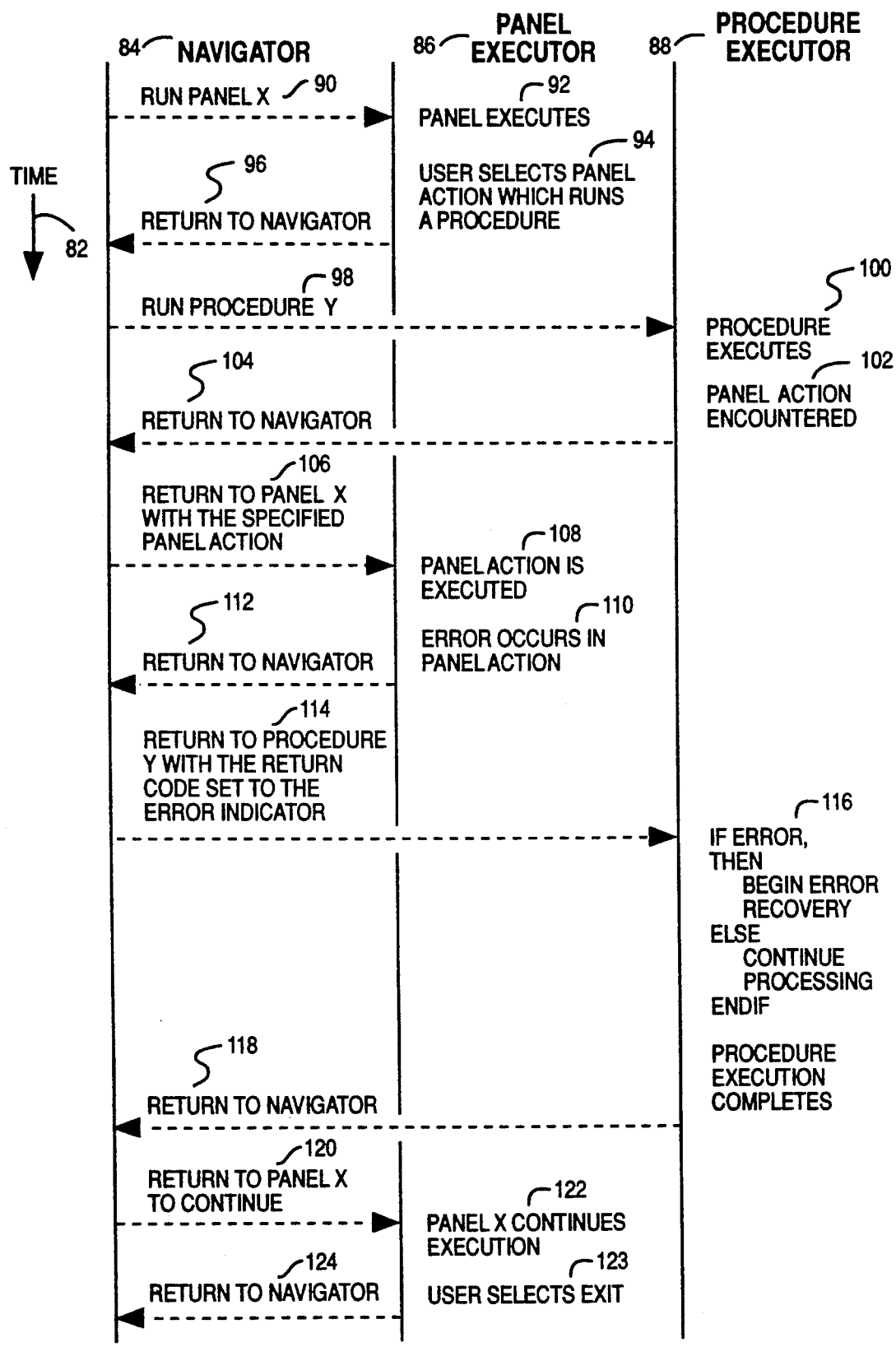
FIG. 3 is a flow diagram of the operation of the invention.

With reference now to FIG. 2 there is shown a functional block diagram indicating a component of the database program 26 of FIG. 1 which facilitates in a Query Manager the interaction between Procedures and Panels in accordance with the invention. The program 26 is provided with a procedure executor module 34 for executing procedures and a panel executor 32 for executing panels. When a panel such as that of FIG. 5 is being run, due to user interaction a user may select or cause a Procedure to be run which the panel executor 32 is incapable of executing, in which instance it is desirable to pass control to the procedure executor 34. In like manner, procedures such as those illustrative examples in the accompanying FIGS. 6–9 may encounter Panel Actions which the procedure executor 34 is incapable of running, whereupon it may be necessary to transfer control back to a panel executor 32 for continued execution of the Panel and associated actions. When running of a Panel or Action is completed in which case it is necessary to return to a Procedure, it may again be necessary to return control to the procedure executor 34 which may finish all logic associated with the particular procedure, and then return control back to the panel executor 32 whereupon the user may then select to exit out of the Panel. In these Panel-Procedure interactions in accordance with the invention, a navigator/controller 30 may thus be provided to control flow and variables between the procedure executor 34 and panel executor 32.

As an example of the operation of such a module as shown in FIG. 2, an application may require running of a Panel whereupon the navigator/controller 30 may be designed so as to issue a call 42 instructing the panel executor 32 to run a particular panel. During execution of this Panel, the user may select an action requiring the running of a Procedure. Panel code being run by the executor 32, in detecting that this Procedure needs to be run and which cannot be run by the panel executor 32, will cause a return code or exit 44 to be issued to the navigator 30 indicating the Procedure to be run. The navigator 30 may then initiate a call 38 to the procedure executor 34 to code running the particular Procedure such as one of those indicated in FIGS. 6–9. In like manner to the Panel requiring execution of a Procedure which the panel executor 32 is not capable of effecting, as aforesaid, the particular Procedure may include a Panel Action which must be executed by the panel executor 32. Accordingly, the procedure executor 34 may be designed to exit or provide a return code 40 to the navigator 30 indicating the particular Panel Action to be run, whereupon the navigator 30 may again pass control via a call 42 to the panel executor 32 instructing the panel executor 32 to process the particular action.

Thus it may be seen that a Procedure can issue an Action affecting how a Panel runs and can update what is seen on a Panel by requiring transfer of information to the Panel. In like manner, the Panel is based upon tables and can access tables, obtain information from one table, and update a Panel dealing with a different table by this Panel-Procedure interaction, and thus the navigator/controller 30 provides this controlled flow of the Query Manager function. Because of this need for interaction, a variable pool 36 is provided which both the procedure executor 34 and panel executor 32 have access to and can update. In the Query Manager of the invention, a variable pool 36 of FIG. 2, also known as an environment stack, is provided for each object which may be run by the system 10, i.e., a panel or procedure. When a panel is run, as in the case of a procedure also, it creates its own section on the variable pool. Each section of the variable pool is local to the object which created it. Variables in each section of the variable pool are accessible by objects, i.e., a procedure that is run from the original object. What is contained in the panel's section of this variable pool is all local variables associated with each field in the panel. Similarly the procedure's section of the variable pool contains all local variables associated with the procedure. When an object is terminated or exited all local variables associated with that object are discarded. Also contained in the variable pool is a section known globally to all objects, i.e., panels and procedures. These global variables exist for the duration of the Query manager session.

For example, for a credit panel having three variable fields of credit limit, balance, and max balance, the values associated with each such field of the credit panel are stored in a corresponding section of the variable pool. Accordingly, with respect to the reference to variable pool A in FIG. 4, this corresponds to the section of the variable pool 36 containing the data values in the fields of the panel A, the customer panel of FIG. 5. Similarly, reference to variable pool B in FIG. 4 indicates the section of the variable pool 36 containing variables of fields associated with the credit panel.

Now that an overview of the interrelationship and operation between the panel executor 32 and procedure executor 34 has been provided, a more detailed but generalized discussion of their operation will follow with reference to FIG. 3. FIG. 3 is intended to show this transfer of control and flow between the procedure executor 34, navigation/controller 30, and panel executor 32 in a typical execution of a Panel X which occasions the running of a Procedure Y. Thus, flow is shown temporally in the direction of a time axis 82 with navigator, panel executor and procedure executor function columns 84, 86, and 88, respectively, having entries showing respective functions performed by these components as a function of time during the running of the Panel X and Procedure Y.

Thus, in the illustration, if it is desired for the database program 26 of the system 10 to run a panel, 90, the Query Manager code module containing the navigator 30 will cause the navigator 30 to locate the particular panel code and, by means of the call 42, to call code running the particular panel to be executed by the panel executor 32 as shown at step 92 wherein the panel executes. During the running of the panel by the panel executor 32, a user may occasion the selection of a panel action which requires the running of a procedure, as shown at reference numeral 94 of FIG. 3. It will be recalled that the panel executor 32 is structured such that it will detect that code is necessary to be run which it cannot execute (i.e., the panel action, inasmuch as the panel executor executes the panel, not a procedure).

Accordingly, the panel executor 32 exits via 44, FIG. 2, returning back to the navigator 30 as shown at 96 in FIG. 3, thereby communicating to the navigator that it is necessary to run the particular Procedure. The navigator, thus, in turn, initiates a call 38, FIG. 2, to the procedure executor 34 as shown at reference numeral 98, FIG. 3, whereupon the procedure executor 34 runs each line of logic in the Procedure (such as those of FIGS. 6-9), as indicated at 100, FIG. 4. It will be recalled that inside the Procedure a Panel Action may be encountered, 102, such as a "Next" which is something which is desired to be done to the particular panel being run. However, inasmuch as the procedure executor 34 cannot process such Panel Actions, the procedure executor 34 provides a return code 40 to the navigator 30 whereby the navigator is instructed that the procedure executor 34 has a Panel Action to be run (which of course cannot be run by the procedure executor 34). This step is indicated at 104 of FIG. 3.

The procedure executor has thus instructed the navigator to run the panel executor again in the same panel previously run by passing control back to the navigator and indicating that the procedure executor has been called to process an action and not to initiate execution. The navigator, in response, by issuing a call 42 again will cause a return to the Panel X with the specified Panel Action obtained from the Procedure being executed by the procedure executor 34, as shown at 106 of FIG. 3. The particular Panel Action is thence executed by the panel executor 32 at 108. Normally, the panel executor would process the action at 108, effect the change, and return control back to the navigator 30 which, in turn, would transfer control back to the procedure executor 34 to complete the Procedure processing including the rest of its logic embodied in the particular Procedure.

However, if during such Panel Action execution an error were to occur as indicated at 110, FIG. 3, in a return 44 to the navigator at 112 an indication is provided of the particular error. Thus when the navigator 30, in turn, returns control to the procedure executor 34 by means of another call 38, the return code set to the error indicator will be passed from the panel executor 32, through the navigator 30 to the procedure executor 34 as shown at 114, FIG. 3. The procedure executor 34 may then check to determine if the return code is proper and if not (i.e., an error has in fact been detected), the procedure executor 34 may commence whatever error recovery has been built into the Procedure. This may simply be a termination of the procedure due to the error, whereupon the procedure executor 34 simply returns control via 40 through the navigator 30 and back to the executing Panel which regains control and may provide an error message to be displayed if desired. This step is shown at reference numeral 116 of FIG. 3. If no error has been detected by the procedure executor 34, it will complete its procedure execution, return control to the navigator 30 as shown at step 118, which in turn will return control to the panel executor 32 as shown at step 120 for continued execution of the Panel X as shown at step 122. At this point, the user may elect to exit, 123, by activating the exit function 138 as shown representatively on FIG. 5, whereupon control is returned, 124, to the navigator 30.

During the design of a panel, a procedure may be specified that will automatically be called during execution of the panel for each row or panel instance that is to be processed. The procedure may contain a panel operation which causes the next row to be retrieved for processing. In this way, a loop is set up for automatically processing all the rows in the panel set.

Now that a general explanation has been provided of the flow of the system of the invention with reference to FIG. 3, a specific example of an application using the system will be described with reference to FIG. 4. In this application, an automatic update of customer credit limits is desired with exceptions. This application is designed to sequentially select each customer, look up their credit information in tables comprising the database, and then either (1) update their credit rating and credit limit based on their on-time payment record (wherein processing continues with the next customer and no panel is displayed); or (2) display a panel such as that of FIG. 5. This panel shows the customer number and other detailed information including the customer's on-time payment percentage, and a message stating whether the percentage is good or bad, in which case a reminder message is provided to the database user to send a thank you or dunning letter, respectively.

The credit information for each customer is in a separate table from the customer table in the database. This table is accessed via a procedure in accordance with the invention that is called automatically from the panel containing the customer table. The procedure controls the processing based on the values in the credit table (on-time percent and credit rating). Values in the customer table are updated based upon values in the credit table.

Figure 4:
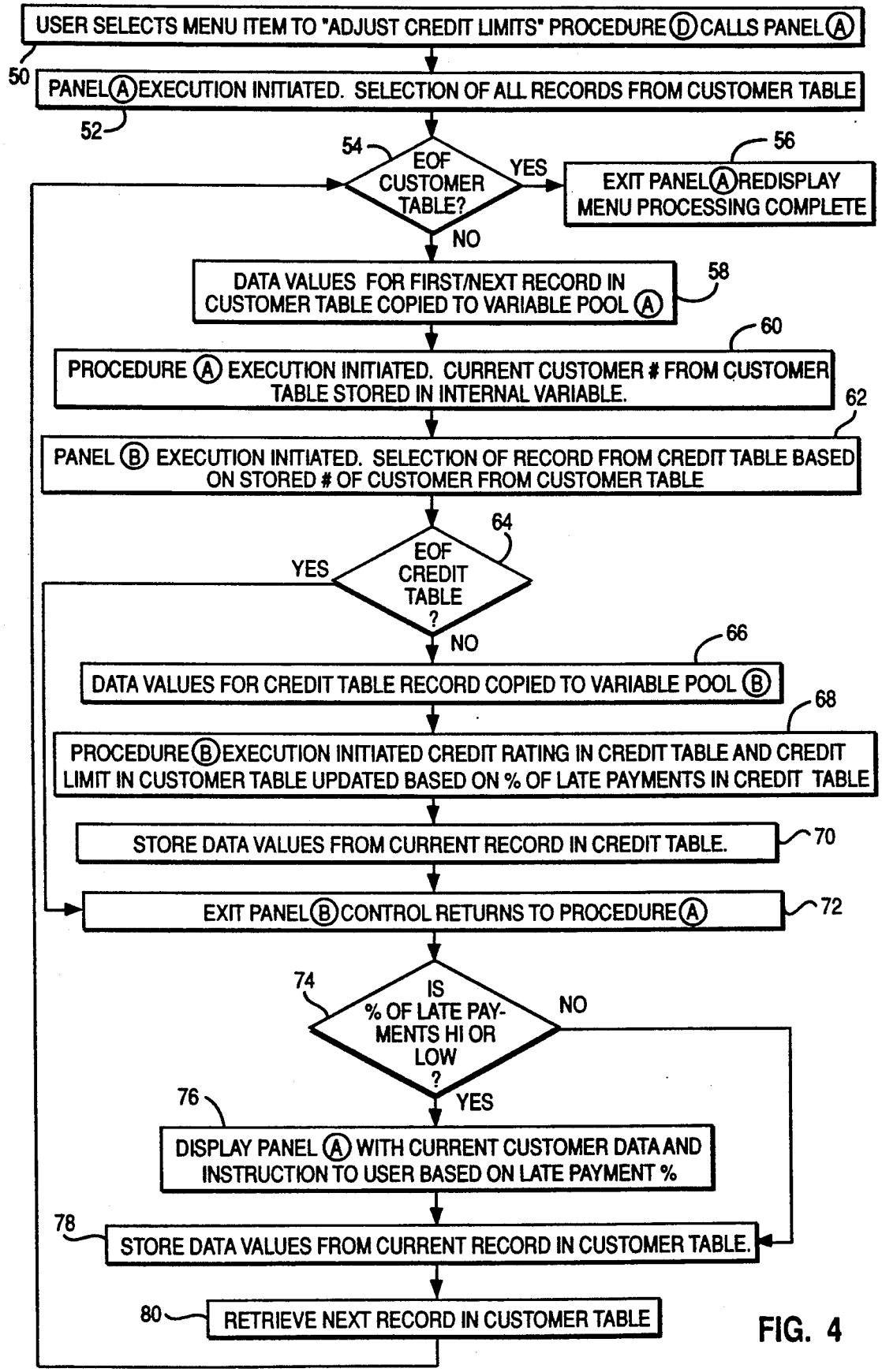
FIG. 4 is a flow diagram of a representative example application of the invention.
Figure 9:
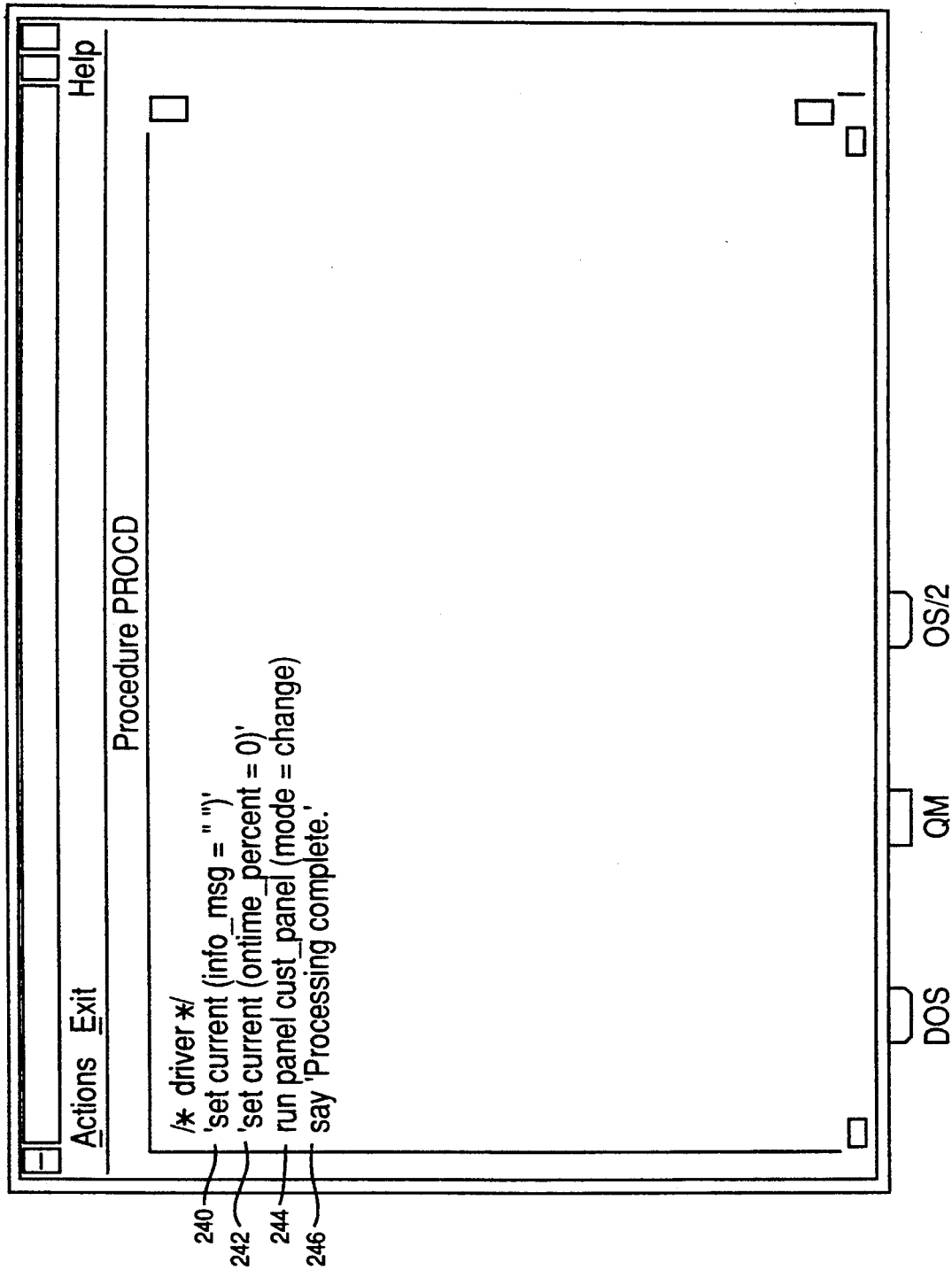

Referencing FIG. 4 now, block 50 indicates that the user is preferably provided with a menu wherein an item is selected to begin the process of adjusting credit limits. The next block 52 indicates the first panel is initiated. This is referred to as panel A (FIG. 5) which is being displayed by execution of procedure D (FIG. 9). This panel selects all the customer records from the customer table, processes each one individually, and then passes execution or control back to the menu. Decision block 54 indicates checking to determine whether the process has reached the end-of-file condition on the customer table which is the start of the loop. Block 56 indicates that upon completing execution (i.e., the end of the customer table is reached), the panel A of FIG. 5 is exited and the menu starting the process is redisplayed. At block 58, if processing is not complete, for each customer record being pulled in and accessed in the panel, data values associated with the record in a customer table are copied to the variable pool 36 of FIG. 2.

Block 60 in the flow diagram indicates that procedure A (FIG. 6) is automatically being executed. The current customer number is thus stored as an internal or procedure variable and used at block 62 to select the record in the credit table for that particular customer, automatically causing execution of panel B, which is a credit table (not shown). Up to this point, the process of FIG. 4 has gained access to the credit information for the customer whose information is being processed on the initial panel A. Decision block 64 simply is an end-of-file indicator. When the process is accessing the credit information, block 66 indicates that the particular data values dealing with the credit information for that customer are copied to the variable pool 36 of FIG. 2. Block 68 indicates that the procedure B (FIGS. 6–7) is automatically being executed by the panel B which is running the credit table. This procedure B, as indicated in block 68, takes the credit information in the credit table including the credit rating and credit limit, checks how the particular customer has been performing on time payments and what his or her credit limit is, and then updates the information based on the percentage of on-time payment. Updates are thus made to the credit table at this particular time.

In block 70, as indicated, the values thus updated are stored back in the credit table and a global variable is set to indicate whether the particular customer has either an exceptional or poor on-time payment record. At block 72, the process has completed use of the credit panel B and the associated credit table, whereupon panel B is exited and control returns to the procedure A. At this point variables have thus been set which will be used to affect the customer panel possibly including an indication of the customer's status back to the user. In decision block 74, a check is being made for that variable, i.e., whether the percentage of late payments is set to either high or low. If neither high nor low, branching occurs to block 78 and simply stores the updated values from the current record into the customer table. However, if the percentage of late payments flag has been set high or low at block 74, the process branches to block 76 to display the panel A of FIG. 5 with current customer data and an instruction to the database user based upon the late payment percentage. At this point, the process has thus determined that the credit status for this particular customer is either high or low. Consequently the process will display the panel having the customer data thereon as well as a field being displayed on the screen based upon this credit information for that customer indicating that he or she either has a good or poor record of payment, adding an instruction text on the panel such as the field 132 of FIG. 5 advising the user to take some action. This action, as indicated by the messages at field 132, in this particular application may translate to a request to send the customer a letter indicating appreciation or concern for the customer's particular credit status.

The display of panel A, the customer panel, will include data values from the customer table shown for the current customer number, along with computed values based on accessed data from the credit table for the current customer number, as well as detailed customer data from a lookup table connected to the customer table.

Block 80 simply indicates that when processing is complete of the current customer's data, the next record relating to the next customer in the customer table will be retrieved automatically in the case of customers not having either very high or low percentages of late payments, whereupon the end of file of the customer table check is made again at process 54 and the looping thence continues. With respect to the customer having credit performance within the predefined boundary conditions, the procedure logic may automatically go from the previous to the next record in completing the loop. At the end of the processing, exit out of the panel A occurs.

In essence, the looping is achieved by the panel calling a procedure for each record and the called procedure issues a panel operation which causes the next record to be retrieved for processing.

A more detailed description of the functions performed by operation of the various procedures A, B and D with reference to FIGS. 6–9 will now be provided. Referring first to the procedure D of FIG. 9, this is the driver procedure for the illustrative application. Lines 240 and 242 thereof are "set current" calls which initialize two variables which will be copied on to the panel of FIG. 5. Line 244 actually runs the top level panel A of FIG. 5 in the "Change" mode, which is a "Change Data" mode wherein it is desired to search and update rows. Line 246 is simply a message returned to the user after processing is complete so indicating this state of the process.

Figure 6:
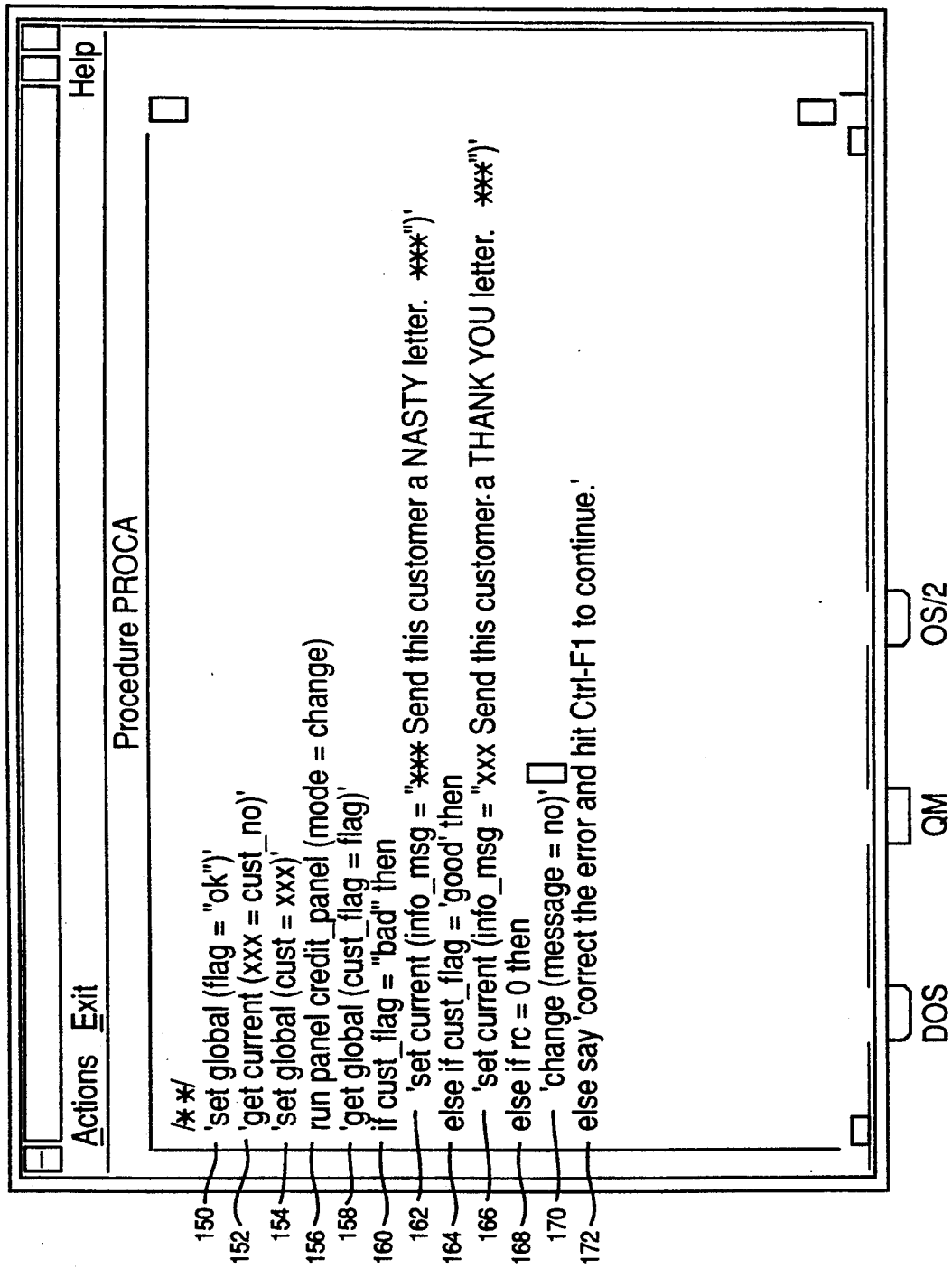

Referring now to FIG. 6, this is the procedure code for procedure A written in the previously noted procedural language. Procedure A is the initial procedure called for each customer record from the panel of FIG. 5, which is the customer panel. This procedure A runs the credit panel (not shown) (this panel being the panel which obtains the credit information for the current customer) and then reflects that process in procedure A by displaying a message on the screen or panel of FIG. 5 reflecting good, bad, or on-time payment records. This is an instance of a procedure affecting the appearance of the panel from the procedure itself. The procedure also attends to committing of customer data and retrieving the next customer data as reflected in line 170 which is part of the looping logic of the procedure and a feature of the invention.

Referring to the individual lines of the procedure of FIG. 6 in greater detail, at line 150 a status flag is being initialized in the global variable pool. At line 152, the procedure is simply taking the customer number field 134 of the customer panel or panel A of FIG. 5 and accessing such information for further use. The procedure at line 154 is setting a global variable in the variable pool 36 which the credit panel may access, thereby allowing the credit panel to search the database for the credit records associated with the particular current customer. Line 156 of the procedure runs the credit panel which, it will be recalled, fetches the credit information for the current customer thereby providing access to that information for procedure B of FIGS. 7-8. At line 158, the procedure A of FIG. 6 obtains values contained in the flag set in procedure B (FIGS. 7-8, lines 196 and 212), wherein the value, after having been set in procedure B, is now being accessed to determine the particular value to which it has been previously set. At lines 160-166, the procedure A is performing a check to see if the credit rating value has been set to bad or good. In particular, in lines 162 and 166, when the credit rating is either bad or good, an information message is being set, which is a computed field 132 in the panel of FIG. 5. This is another instance of logic from a procedure such as procedure A in this case updating fields appearing on a panel such as the panel A of FIG. 5. In this particular instance, this information message is an indication to the user to send the customer a particular type of letter.

In lines 168 to the end of procedure A, a check of a return code RC is being made which is a global variable stored in the variable pool 36 to obtain an indication of whether or not an error has occurred. If there has been no occurrence of error, line 170 of the procedure executes a commit of the changes to the panel of FIG. 5 to the database and obtains the next customer record automatically. This is an example of part of the looping logic feature of the invention. At line 172, if the return code is non-zero, which may occur, for example, due to automatic data validation being performed by the panel indicating that character data was placed in a numeric field, the panel of FIG. 5 is modified to provide an instruction to the user to correct the error and hit a control key to continue the process.

Referring now to FIGS. 7 and 8, these are procedure code lines of procedure B which is the initial procedure called by the credit panel which is the panel accessing the credit table yielding credit information for the current customer. The credit panel, it may be recalled, is called by the panel A of FIG. 5. Based upon the percentage of on-time payments and the credit rating of the particular customer, this procedure B in general determines a new credit limit, which is a field 139 of FIG. 5, and updates this credit limit.

Referring to the specific lines of the procedure B, line 180 of procedure B is a "Get Current" call necessary since the procedure needs to know the value of the on-time field, which is a field in the credit panel. Line 182 of the procedure is also a call to obtain the value of another field in the credit panel of the customer's credit rating. Line 184 is yet an additional call to obtain the value of yet another field in the credit panel which, of course, is the panel defined on the credit table. Specifically, the value obtained by line 184 is the maximum balance permitted to the customer. In like manner, procedure lines 186 and 188 obtain additional fields from the credit panel, namely the current balance and credit limit contained in fields 141 and 143 of FIG. 5.

Now that values for the current customer have thus been obtained from the panel of FIG. 5 regarding the customer's credit information, at line 190 a check is made of a "late val" which is the procedure name for on-time payment to determine if this is less than a preselected value which in this case is 0.5. If the late value is less than this preselected value, then logic is performed at procedure steps 192-198 to set the credit rating (line 192), updating the limit which in this case is being set to what the current balance is, thereby indicating the customer is a poor credit risk based on on-time payments. Thus, essentially, that particular customer would be precluded from making additional purchases. At line 196 the global variable is being set by procedure B which was being checked by the procedure A previously described with reference to FIG. 6.

Procedure lines 202-208 correspond to the case when the late value is greater than 0.5. Line 202 checks to see if the late value is greater than 0.65, in which case the credit rating is set to 4. In like manner, procedure lines 204-206 check to see if the late value is in excess of 0.75, or 0.85 in which case the credit rating is set to 3 and 2, respectively. If the late value is in excess of 0.95 when checked at line 208, then line 210 sets the credit rating to 1, in which case the global flag is set again at line 212, which is checked by the procedure A in the manner previously described. Specifically, in this case the global flag would be set to "good" in which case a commendatory letter would be sent to the customer, and the panel of FIG. 5 would be adjusted to so indicate this recommendation to the database user.

At line 216 of FIG. 7 (duplicated as line 218 of FIG. 8 to indicate continuity), if the credit rating was set to 3 by the procedure line 204 discussed above, then the customer's credit limit will be increased by 0.1 as performed by the procedure line 220. Similarly if the credit rating set previously in the procedure was a 2 as indicated by procedure line 222, then the credit limit would be increased by 0.2 by execution of the procedure line 224. As indicated by procedure line 226, if the credit rating previously set in the procedure was 1 (indicating an extremely good credit risk), then this particular customer's credit limit will be set by procedure line 228 to whatever his or her maximum balance is, increased by 20%. At line 232, the credit limit has thus been updated by this procedure and it is desired to update the credit limit field in the panel of FIG. 5 (field 139) by what has now been established as the new limit. Thus line 232 of the procedure, "Set Current", causes the previously adjusted limit determined by the procedure B to be placed in the credit limit field 139 of FIG. 5 to thereby update the panel of FIG. 5. Similarly, at line 234, a credit rating field in the credit panel is, in like manner, updated. At line 236, the value of "late val" it will be recalled was obtained from the credit panel. This value is now being copied into the "ontime_percent" computed field 136 of the panel of FIG. 5. Thus, in accordance with a feature of the invention, information is being copied from one panel to another using a procedure. Finally, with respect to the procedure B of FIG. 8, with reference to procedure line 238, this line permits the changing of the credit record for this customer which is a part of the looping logic feature of the invention.

While the invention has been shown and described with reference to particular embodiments thereof, it will be understood by those skilled in the art that the foregoing and other changes in form and details may be made therein without departing from the spirit and scope of the invention.

We claim:

1. A method for sequencing actions within a panel in a computerized database, comprising the steps of executing program code corresponding to a panel;

detecting a user-selected panel action for executing a procedure having an embedded panel action;

executing program code corresponding to said procedure until said embedded panel action is detected;

returning to said panel with said embedded panel action;

executing program code corresponding to said embedded panel action; and automatically returning to program code corresponding to execution of a procedure wherein said automatic execution of program code corresponding to said procedure is in response to detecting a preselected state of said panel from a plurality of states comprising a. a first state when execution of program code corresponding to a panel set begins; and b. a second state when execution of program code corresponding to a panel instance begins; and c. a third state when said panel set is exited and further wherein said procedure includes looping logic statements causing automatic batch panel executions of program code corresponding to a plurality of said panels.

2. The method of claim 1 further including the step of detecting an error in said execution of program code corresponding to said embedded panel action; returning to said procedure with a return code set to indicate said error; recovering from said error in response to said procedure; and returning to said panel to continue said execution of program code corresponding to said panel.

3. In a computerized database system, a method of interacting with said database, comprising the steps of specifying first and second procedures;

executing program code corresponding to said first procedure;

generating a panel;

varying field data in said panel as a function of said executed program code corresponding to first procedure;

monitoring said panel to detect a predefined state from a plurality of states comprising a. a first state when execution of program code corresponding to a panel set beings; and b. a second state when execution of program code corresponding to a panel instance begins; and c. a third state when said panel set is exited and automatically executing program code corresponding to said second procedure in functional response to said detected state.

4. A method for interacting with a database comprising specifying a procedure with a procedural language including procedural logic;

generating a panel having associated therewith a plurality of panel actions;

monitoring the state of multiple fields in said panel; and automatically executing program code corresponding to a plurality of said panel actions in response to said procedural logic operating upon said monitored state of said fields.

5. A method for operating a batch panel defining panel actions in a database system, comprising the steps of specifying a procedure with a procedural logic including a plurality of looping logic statements; and executing program code corresponding to said procedure to invoke a sequential execution of program code corresponding to said batch panel in response to said looping logic statements in said executing program code corresponding to procedure.

6. The method of claim 5 wherein said sequential execution of program code corresponding to said batch panel is invoked automatically in response to detection of a state of multiple fields within said panel and without user input.

7. The method of claim 6 further including reading field data in at least one of said panels in response to said executed procedure;

initiating execution of program code corresponding to a next panel or procedure automatically as a function of said reading of said field data; and wherein processing of said panel actions is delayed when run from said procedure to permit changing of said data.

8. A method for interacting with a database comprising the steps of generating a panel having associated therewith a plurality of panel actions and field data;

specifying a procedure in a procedural language including procedural logic;

executing program code corresponding to said procedure with a user-selected one of said panel actions;

detecting within said procedure when the state of said field data contained within said panel are in one of a plurality of pre-defined states; and automatically executing program code corresponding to a plurality of said panel actions in response to said procedural logic operating upon said predefined states of said field data.

9. The method of claim 8 wherein said plurality of panel actions are in a sequence defined by said procedural logic.

* * * * *